(12) United States Patent
Jin

(10) Patent No.: US 10,210,604 B2
(45) Date of Patent: Feb. 19, 2019

(54) METHOD AND DEVICE FOR ADJUSTING CONTRAST

(71) Applicant: SHENZHEN CHINA STAR OPTOELECTRONICS TECHNOLOGY CO., LTD., Shenzhen (CN)

(72) Inventor: Yufeng Jin, Shenzhen (CN)

(73) Assignee: SHENZHEN CHINA STAR OPTOELECTRONICS TECHNOLOGY CO., LTD. (CN)

(*) Notice: Subject to any disclaimer, the term of this patent is extended or adjusted under 35 U.S.C. 154(b) by 0 days.

(21) Appl. No.: 14/908,150

(22) PCT Filed: Dec. 31, 2015

(86) PCT No.: PCT/CN2015/100215
§ 371 (c)(1),
(2) Date: Jan. 28, 2016

(87) PCT Pub. No.: WO2017/063299
PCT Pub. Date: Apr. 20, 2017

(65) Prior Publication Data
US 2018/0211368 A1    Jul. 26, 2018

(30) Foreign Application Priority Data
Oct. 15, 2015  (CN) .......................... 2015 1 0666784

(51) Int. Cl.
*G06T 5/00*    (2006.01)

(52) U.S. Cl.
CPC ............... *G06T 5/007* (2013.01); *G06T 5/00* (2013.01)

(58) Field of Classification Search
CPC ... G06T 5/007; H04N 5/57; G09G 2320/0626
See application file for complete search history.

(56) References Cited

U.S. PATENT DOCUMENTS

| 8,164,603 | B2* | 4/2012 | Lee | .................... G09G 3/006 345/690 |
| 8,559,511 | B2* | 10/2013 | Ngan | .................. H04N 19/159 375/240.02 |

FOREIGN PATENT DOCUMENTS

| CN | 103792699 A | 5/2014 |
| CN | 104966272 A | 10/2015 |

* cited by examiner

*Primary Examiner* — Antonio A Caschera
(74) *Attorney, Agent, or Firm* — Emerson, Thomson & Bennett, LLC; Roger D. Emerson

(57) ABSTRACT

A method for adjusting contrast includes: acquiring a corresponding grey-scale image of a current image; dividing the grey-scale image to obtain a plurality of divided regions; calculating JND values corresponding to the divided regions based on an area of each of the divided regions; and calculating a target contrast based on the JND value of each of the divided regions and a background brightness of the current image; adjusting the contrast of the current image based on the target contrast and a predetermined condition.

16 Claims, 12 Drawing Sheets

METHOD AND DEVICE FOR ADJUSTING CONTRAST

BACKGROUND OF THE INVENTION

Field of Invention

The present invention relates to an image processing technology, and in particular to a method and device for adjusting contrast.

Description of Prior Art

Contrast means the measurement of different brightness levels between the brightest white and the darkest black in an image, and it reflects the magnitude of gray difference of an image. The greater the difference the greater the contrast ranges.

Adjusting the image contrast is an important means to enhance image display effect. In existing technology, the method for adjusting the image contrast is generally to convert the image to HSV (hue-saturation-value) color space or LAB (L is the abbreviation the of luminosity indicating the brightness; AB represents color channels, A represents a range from magenta to green, B represents a range from yellow to blue) color space, and then to adjust a luminance curve of a brightness component (V or L) to change brightness corresponding relationships of the pixels before and after the adjustment, thereby achieving the purpose of adjusting the overall contrasts of the image. However, the adjusted image obtained by using this method cannot fully show the details of the image. The distribution of light and dark areas of the image may be undermined, so the effect of the adjustment is poor.

Moreover, it can be adjusted also by using a Gamma parameter of a display device. For example, the contrast of the image can be adjusted by changing the relationship between grey-scale signals and brightnesses, but the setting of a single contrast cannot be applied to all images.

SUMMARY OF THE INVENTION

An embodiment of the present invention provides a method and device for adjusting an image contrast, which are aimed at improving the image contrast.

An embodiment of the present invention provides a method for adjusting contrast, which includes: S1, acquiring a corresponding grey-scale image of a current image; S2, dividing the grey-scale image to obtain a plurality of divided regions; S3, calculating JND values corresponding to the divided regions based on an area of each of the divided regions; S4, calculating a target contrast based on the JND value of each of the divided regions and a background brightness of the current image; and S5, adjusting the contrast of the current image based on the target contrast and a predetermined condition; wherein the step S2 specifically is: dividing the grey-scale image by utilizing a watershed algorithm to obtain the plurality of divided regions; the step S4 specifically comprises: S40, calculating an average brightness of each of the divided regions; S41, determining whether a value of the average brightness of each of the divided regions is larger than the background brightness to obtain a determined result; S42, calculating a contrast quantized value of the corresponding divided region based on the average brightness of each of the divided regions, the JND value of each of the divided regions, the background brightness of the current image, and the determined result; S43, calculating the target contrast according to the contrast quantized value.

In the method for adjusting contrast of the present invention, the step S42 specifically comprises: S421, classifying the divided regions based on the determined result; S422, calculating a regional contrast of each class of the divided regions based on the classified result, the average brightness of each class of the divided regions, and the background brightness of the current image; S423, calculating the contrast quantized value of each of the divided regions based on the regional contrast of each of the divided regions and the corresponding JND value.

In the method for adjusting contrast of the present invention, the step S43 specifically comprises: S431, calculating a contrast average value of each class of all the divided regions based on the contrast quantized value of each of the divided regions; S432, calculating the target contrast based on the contrast average value of each class of the divided regions.

In the method for adjusting contrast of the present invention, the step S421 specifically is: classifying the divided regions into a first class of the divided regions and a second class of the divided regions based on the determined result; the step S422 specifically is: calculating the regional contrast of each divided region in the first class of the divided regions by utilizing a first formula; and calculating the regional contrast of each divided region in the second class of the divided regions by utilizing a second formula; wherein the first formula is: $C_H = I_{ave}/I_{bg}$; the second formula is: $C_L = I_{bg}/I_{ave}$; wherein the CH is the regional contrast of the divided region in the first class of the divided regions, and the CL is the regional contrast of the divided region in the second class of the divided regions, the $I_{ave}$ is the value of the average brightness of the divided region, the $I_{bg}$ is the background brightness of the current image.

In the method for adjusting contrast of the present invention, the step S423 specifically is: calculating the contrast quantized value of the divided region in the first class of the divided regions by utilizing a formula $C_{H\text{-}jnd} = C_H/C_{jnd}$; and calculating the contrast quantized value in the second class of the divided regions by utilizing a formula $C_{L\text{-}jnd} = C_L/C_{jnd}$; wherein the $C_{H\text{-}jnd}$ is the contrast quantized value of the divided region in the first class of the divided regions, the $C_{jnd}$ is the JND value, which is indicative of the contrast difference value of each divided region.

In the method for adjusting contrast of the present invention, the JND value is computed by utilizing a following formula in the step S3, the following is:

$$C_{jnd} = \frac{1.97}{S_{jnd}^{0.22} + 0.72}$$

wherein the $S_{jnd}$ is the area of the corresponding divided region.

In the method for adjusting contrast of the present invention, the step S1 comprises: S11, acquiring a RGB color image of the current image; S12, transforming the RGB color image into a grey-scale image based on a SRGB standard; and S13, valuing the grey-scale image based on a mode of grey-scale distribution of the grey-scale image to obtain the background brightness of the current image.

An embodiment of the present invention further provides a method for adjusting contrast. The adjusting method includes: S1, acquiring a corresponding grey-scale image of a current image; S2, dividing the grey-scale image to obtain a plurality of divided regions; S3, calculating JND values corresponding to the divided regions based on an area of each of the divided regions; S4, calculating a target contrast based on the JND value of each of the divided regions and a background brightness of the current image; and S5, adjusting the contrast of the current image based on the target contrast and a predetermined condition.

In the method for adjusting contrast of the present invention, the step S4 specifically comprises: S40, calculating an average brightness of each of the divided regions; S41, determining whether a value of the average brightness of each of the divided regions is larger than the background brightness to obtain a determined result; S42, calculating a regional contrast quantized value of the corresponding divided region based on the average brightness of each of the divided regions, the JND value of each of the divided regions, the background brightness of the current image, and the determined result; S43, calculating the target contrast according to the contrast quantized value.

In the method for adjusting contrast of the present invention, the step S42 specifically comprises: S421, classifying the divided regions based on the determined result; S422, calculating a regional contrast of each class of the divided regions based on the classified result, the average brightness of each class of the divided regions, and the background brightness of the current image; S423, calculating the contrast quantized value of each of the divided regions based on the regional contrast of each of the divided regions and the corresponding JND value.

In the method for adjusting contrast of the present invention, the step S43 specifically comprises: S431, calculating a contrast average value of each class of all the divided regions based on the contrast quantized value of each of the divided regions; S432, calculating the target contrast based on the contrast average value of each class of the divided regions.

In the method for adjusting contrast of the present invention, the step S421 specifically is: classifying the divided regions into a first class of the divided regions and a second class of the divided regions based on the determined result; the step S422 specifically is: calculating the regional contrast of each divided region in the first class of the divided regions by utilizing a first formula; and calculating the regional contrast of each divided region in the second class of the divided regions by utilizing a second formula; wherein the first formula is: $C_H = I_{ave}/I_{bg}$; the second formula is: $C_L = I_{bg}/I_{ave}$; wherein the $C_H$ is the regional contrast of the divided region in the first class of the divided regions, and the $C_L$ is the regional contrast of the divided region in the second class of the divided regions, the $I_{ave}$ is the value of the average brightness of the divided region, the $I_{bg}$ is the background brightness of the current image.

In the method for adjusting contrast of the present invention, the step S423 specifically is: calculating the contrast quantized value of the divided region in the first class of the divided regions by utilizing a formula $C_{H\text{-}jnd} = C_H/C_{jnd}$; and calculating the contrast quantized value in the second class of the divided regions by utilizing a formula $C_{L\text{-}jnd} = C_L/C_{jnd}$; wherein the $C_{H\text{-}jnd}$ is the contrast quantized value of the divided region in the first class of the divided regions, the $C_{jnd}$ is the JND value, which is indicative of the contrast difference value of each divided region.

In the method for adjusting contrast of the present invention, the step S2 specifically is: dividing the grey-scale image by utilizing a watershed algorithm to obtain the plurality of divided regions.

In the method for adjusting contrast of the present invention, the JND value is computed by utilizing a following formula in the step S3, the following is:

$$C_{jnd} = \frac{1.97}{S_{jnd}^{0.22} + 0.72}$$

wherein the $S_{jnd}$ is the area of the corresponding divided region.

In the method for adjusting contrast of the present invention, the step S1 comprises: S11, acquiring a RGB color image of the current image; S12, transforming the RGB color image into a grey-scale image based on a SRGB standard; and S13, valuing the grey-scale image based on a mode of grey-scale distribution of the grey-scale image to obtain the background brightness of the current image.

An embodiment of the present invention further provides a contrast adjusting device, which includes: a grey-scale image acquiring module utilized to acquire a corresponding grey-scale image of the current image; a regional division module utilized to divide the grey-scale image to obtain a plurality of divided regions; a regional division module utilized to divide the grey-scale image to obtain a plurality of divided regions; a first calculating module utilized to calculate JND values corresponding to the divided regions based on an area of each of the divided regions; a second calculating module utilized to calculate a target contrast based on the JND value of each of the divided regions and a background brightness of the current image; and a adjusting module utilized to adjust the contrast of the current image based on the target contrast and a predetermined condition.

In the present invention, the contrast of the entire image is eventually obtained by first dividing the grey-scale image to obtain the plurality of divided regions, comparing the average brightness of each divided region with the background brightness, classifying the plurality of divided regions, respectively calculating the contrast quantized values for the corresponding divided regions based on the JND value of each divided region, and obtaining the contrast average value of each class of the divided regions. In the present invention, since the contrast of the image is adjusted according to the regions by using the JND values, the area of each divided region can be adjusted correspondingly. In the processes of the contrast adjustment, the impact that the human eye can perceive the image brightness is considered, so that the image contrast is closer to the needs of the human eye, and the contrast adjustment is more scientific.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE PREFERRED EMBODIMENTS

The present invention will now be combined with the accompanying drawings in the embodiments of the present invention to clear and completely describe the technical solutions in the embodiment of the present invention. Based on the embodiments of the present invention, all other embodiments obtained by those skilled in the art without the premise of creative efforts are within the scope of the present invention.

Figure 1:
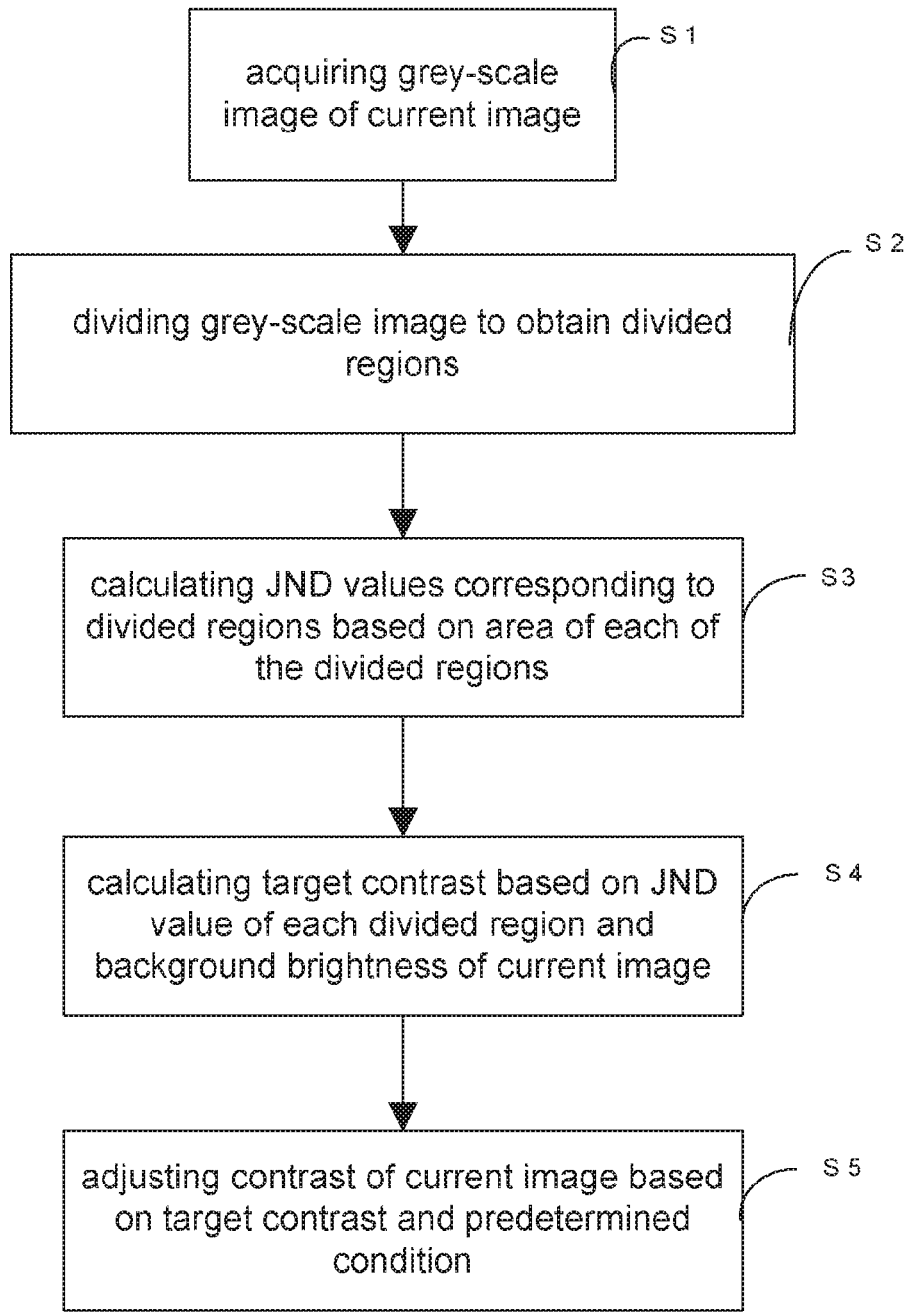
FIG. 1 is a flow chart illustrating a method for adjusting contrast according to a first preferred embodiment of the present invention.

Referring to FIG. 1, which is a flow chart illustrating a method for adjusting contrast according to a first preferred embodiment of the present invention. The A method for adjusting contrast specifically includes:

Step S1, acquiring a corresponding grey-scale image of a current image;

Step S2, dividing the grey-scale image to obtain a plurality of divided regions.

In the embodiment, at first the region of the grey-scale image needs to be divided to obtain more than one divided region. For dividing the grey-scale image, the division of features is mainly performed in the embodiment. The features may include a gray, texture, contour, gray scale, etc. of the image. The dividing method may include a thresholding algorithm, a dividing algorithm based on regions, and a dividing algorithm based on edges.

Preferably, the embodiment employs a watershed algorithm for dividing the grey-scale image. It is mainly to see the image as a topological landform in geomorphology, and a gray scale value of each pixel on the image represents the altitude of the point. Each local minimum value and its impact area is a basin, and a boundary of the basin forms the watershed. The watershed algorithm mainly includes two steps: first, processing the image, i.e. arranging the pixels of the image in an ascending order according to the magnitudes of the gray-scale values; second, scanning according to the arranged order to construct catchment basins, and constructing waterproof dams on the edges of the differently labeled catchment basins for initially dividing the image regions. The specific implementation process can include: using a sobel operator to obtain a gradient magnitude image; marking foreground objects and calculating; calculating background and marking; calculating a watershed transform of a partition function, and so on. Since the above-mentioned processes belong to the prior art, no further detail will be provided herein.

Step S3, calculating JND values corresponding to the divided regions based on an area of each of the divided regions.

In the embodiment, said JND (Just noticeable difference) is the smallest noticeable difference, which is a quantity unit for measuring the degree of difference between the two psychological feelings. Since the human eye has different degrees of brightness sensitivity to different images, the JND value can quantitatively measure the impact that the human eye can perceive the image brightness. In a preferred proposal of the embodiment, the JND value is calculated by the following formula:

$$C_{jnd} = \frac{1.97}{S_{jnd}^{0.22} + 0.72};$$

where the $C_{jnd}$ is the JND value, which is indicative of the corresponding contrast difference value of each divided region, and the $S_{jnd}$ is the area of the corresponding divided region.

Step S4, calculating a target contrast based on the JND value of each of the divided regions and a background brightness of the current image;

Specifically, the target contrast can be computed by calculating the average brightness of each of the divided regions, the JND value, and the background brightness of the current image. Furthermore, the average brightness of the divided region and the background brightness of the current image can be obtained simultaneously with the step S3, but also after the step S3, or before to the step S4. This is not restricted herein.

Step S5, adjusting the contrast of the current image based on the target contrast and a predetermined condition. In the embodiment, the predetermined condition may include a resolution requirement of the display screen, the contrast of the current image, and other display parameters. This is not restricted herein.

In the embodiment, the contrast of the entire image is eventually obtained by first dividing the grey-scale image to obtain the plurality of divided regions, determining the average brightness of each divided region with the background brightness, classifying the plurality of divided regions according to the determined result, respectively calculating the contrast quantized values for the corresponding divided regions based on the JND value of each divided region, and obtaining the contrast average value of each class of the divided regions. In the present invention, since the contrast of the image is adjusted according to the regions by using the JND values, the area of each divided region can be adjusted correspondingly. In the processes of the contrast adjustment, the impact that the human eye can perceive the image brightness is considered, so that the image contrast is closer to the needs of the human eye, and the contrast adjustment is more scientific.

Figure 2:
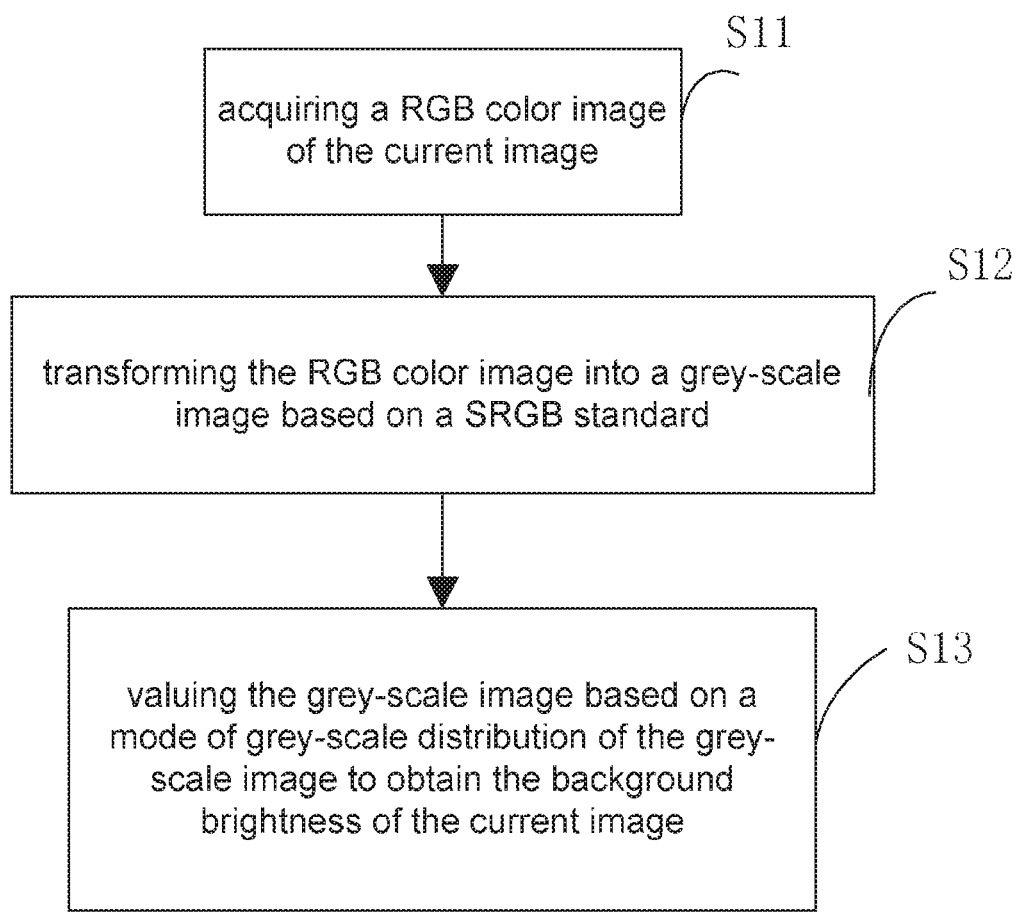
FIG. 2 is a specific flow chart illustrating step S1 of the first preferred embodiment of the method for adjusting contrast of the present invention.
Figure 3:
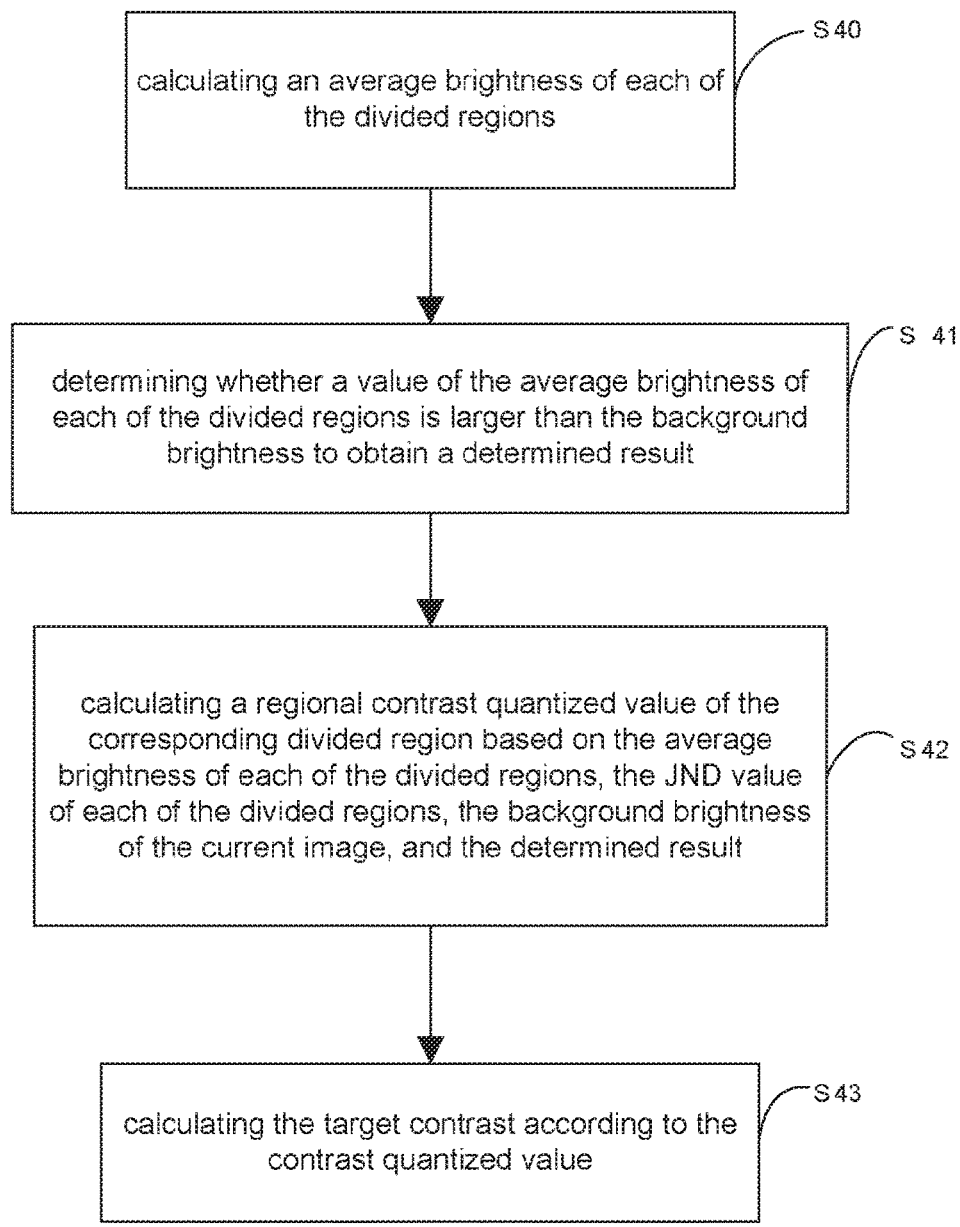
FIG. 3 is a specific flow chart illustrating step S4 of the method for adjusting contrast according to the first preferred embodiment of the present invention.

In a preferred proposal of the present invention, as shown in FIG. 2, FIG. 3 is a specific flow chart illustrating step S1 of the first preferred embodiment of the method for adjusting contrast of the present invention. The step S1 herein can includes:

Step S11, acquiring a RGB color image of the current image;

Step S12, transforming the RGB color image into a grey-scale image based on a SRGB standard.

In the embodiment, since the SRGB (standard Red Green Blue) standard belongs to the prior art, and the transforming process also belong to the prior art, no further detail will be provided herein.

Step S13, valuing the brightness of the grey-scale image based on a mode of grey-scale distribution of the grey-scale image to obtain the background brightness of the current image.

It should be noted that acquiring the background brightness is not limited to be performed before the step S2. It is also performed after step S2 and before the step S4. This is not restricted herein.

Furthermore, as shown in FIG. 3, FIG. 3 is a specific flow chart illustrating step S4 of the method for adjusting contrast according to the first preferred embodiment of the present invention. The step S4 specifically includes:

Step S40, calculating an average brightness of each of the divided regions;

The average brightness of each of the divided regions needs to be computed first. There are several calculation methods for calculating the average brightness of each of the divided regions. Preferably, the average brightness of the divided region can be obtained by taking an average value of the sum of brightness values of every pixels of one divided region. However, the average brightness also can be calculated by using other ways. This is not restricted herein.

Step S41, respectively determining whether the average brightness of each of the divided regions is larger than the background brightness of the current image, to obtain a determined result.

In the embodiment, the average brightness of each divided region is determined with the background brightness of the current image. When the average brightness is larger than the background brightness, the determination is a first determined result. When the average brightness is less than the background brightness, the determination is a second determined result.

Step S42, calculating a regional contrast quantized value of the corresponding divided region based on the average brightness of each of the divided regions, the JND value of each of the divided regions, the background brightness of the current image, and the determined result;

Specifically, the contrast quantized values are calculated by different methods according to the different determined results, That is, the regional contrast quantized values of the corresponding divided regions of the first determined result and the corresponding divided region of the second determined result are calculated by using different paths.

In the embodiment, the corresponding JND value is obtained respectively based on the area of each divided region. The regional contrast is adjusted to obtain the contrast quantized value based on the JND value. Since each of the divided regions can be individually adjusted, it is closer to the actual needs of the image, and the adjustment is more scientific.

Step S43, calculating the target contrast according to the contrast quantized value.

In the embodiment, the target contrast is the sum of the calculated contrast quantized values.

It should be noted that this step of calculating the average brightness of each divided region can be performed simultaneously with the step S3, but also after the step S3, or before to the step S3. This is not restricted herein.

Figure 4:
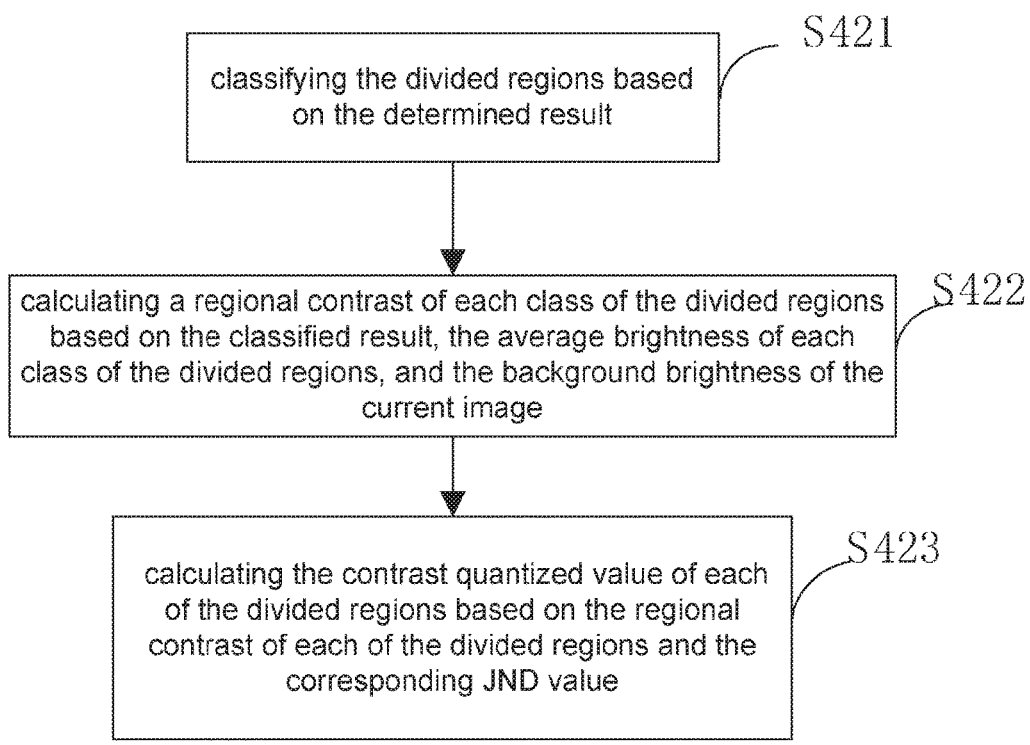
FIG. 4 is a specific flow chart illustrating step S42 of the embodiment of FIG. 3.

In a preferred proposal of the present invention, as shown in FIG. 4, which is a specific flow chart illustrating step S42 of the embodiment based on FIG. 3. The step S42 specifically includes:

Step S421, classifying the divided regions based on the determined result;

In the embodiment, the step specifically is: classifying the divided regions into a first class of the divided regions and a second class of the divided regions based on the determined result. Herein the divided regions corresponding to the first determined result are classified into a first class, and the divided regions corresponding to the second determined result are classified into a second class. In the embodiment, taking the background brightness as a boundary, the divided regions are divided into two categories, and the contrast values of the corresponding areas are respectively calculated, thereby more effectively adjusting the contrast of the image.

Step S422, calculating a regional contrast of each class of the divided regions based on the classified result, the average brightness of each class of divided regions, and the background brightness of the current image.

In the embodiment, specifically, the regional contrast of each divided region in the first class of the divided regions can be obtained by utilizing a first formula; the regional contrast of each divided region in the second class of the divided regions can be obtained by utilizing a second formula. The first formula is: $C_H = I_{ave}/I_{bg}$; the second formula is: $C_L = I_{bg}/I_{ave}$, where the $C_H$ is the regional contrast of the divided region in the first class of the divided regions; the $C_L$ is the regional contrast of the divided region in the second class of the divided regions; the $I_{ave}$ is the value of the average brightness of the divided region; and the $I_{bg}$ is the background brightness of the current image.

Step S423, calculating the contrast quantized value of each of the divided regions based on the regional contrast of each of the divided regions and the corresponding JND value; In the embodiment, the contrast quantized value may be calculated by the following formula. as to the first class of the divided regions, the contrast quantized value of each divided region in the first class of the divided regions is calculated by utilizing the formula $C_{H\text{-}jnd} = C_H/C_{jnd}$, wherein the $C_{H\text{-}jnd}$ is the contrast quantized value of each divided region in the first class of the divided regions. As to the second class of the divided regions, the contrast quantized value of each divided region in the second class of the divided regions is calculated by utilizing the formula $C_{L\text{-}jnd} = C_L/C_{jnd}$, wherein the $C_{L\text{-}jnd}$ is the contrast quantized value of each divided region in the second class of the divided regions.

Figure 5:
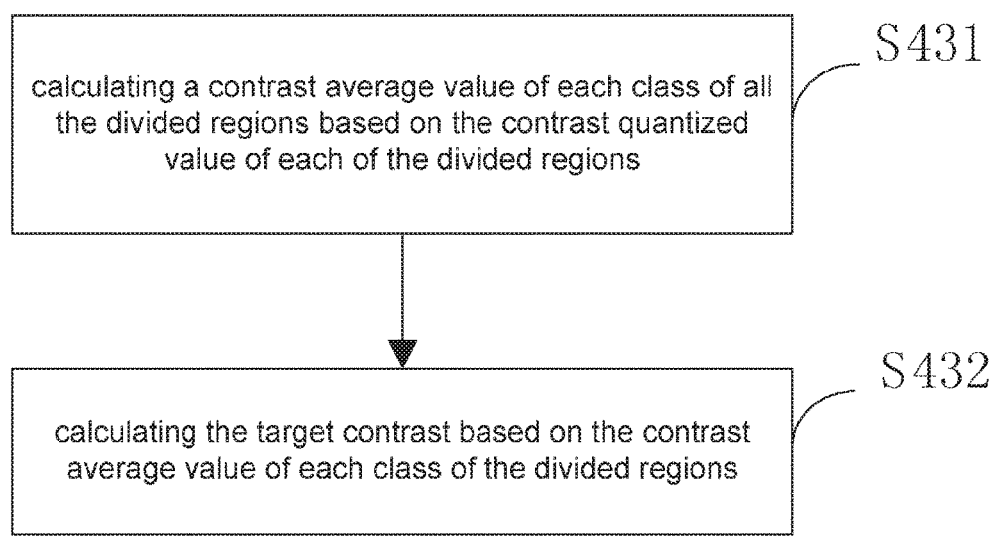
FIG. 5 is a specific flow chart illustrating step S43 of the embodiment of FIG. 3.

Furthermore, as shown in FIG. 5, FIG. 5 is a specific flow chart illustrating step S43 of the embodiment based on FIG. 3. The step S43 specifically includes:

S431, calculating a contrast average value of each class of the divided regions based on the contrast quantized value of each of the divided regions; specifically, the contrast average value of the class of the divided regions is obtained respectively for each class of the divided regions. The corresponding contrast average value can be the average value of the sum of the contrast quantized values of the class of the divided regions. In the embodiment, the contrast average values of the first class and the second class of the divided regions are respectively obtained.

Step S432, calculating the target contrast based on the contrast average value of each class of the divided regions. The target contrast is just the sum of the contrast average values of the first class and the second class of the divided regions.

Figure 6:
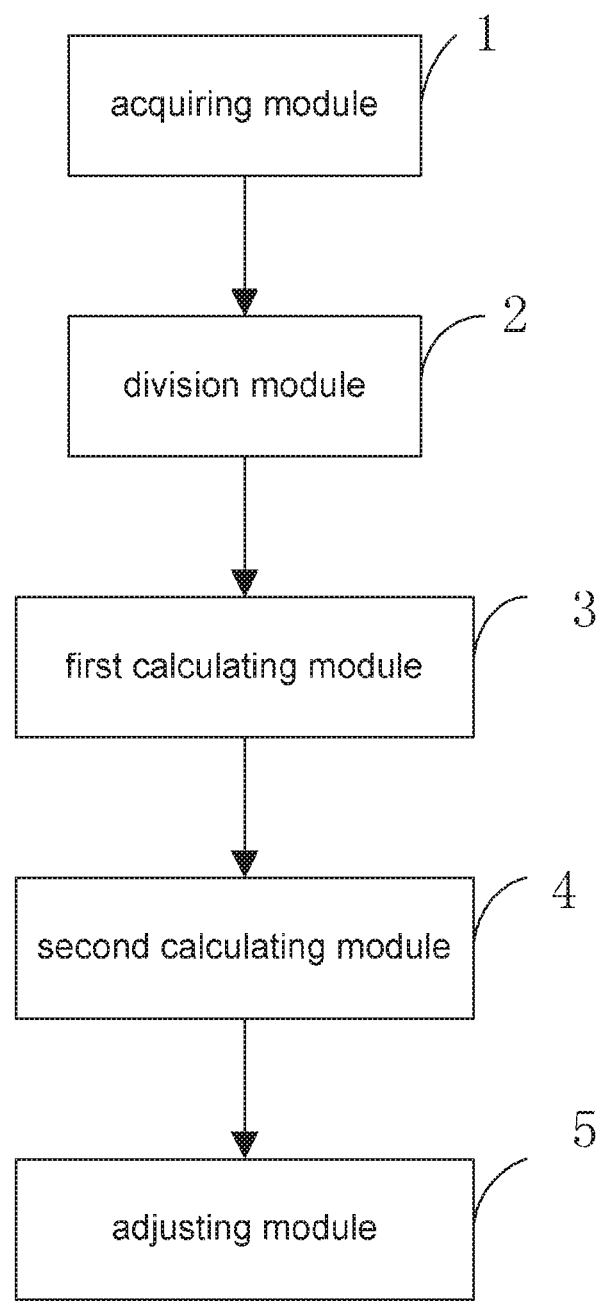
FIG. 6 is a function block diagram illustrating a first preferred embodiment of an image contrast adjusting device of the present invention.

The present invention further provides an image contrast adjusting device. As shown in FIG. 6, which is a function block diagram illustrating a first preferred embodiment of an image contrast adjusting device of the present invention.

The device includes an acquiring module 1 utilized to acquire a corresponding grey-scale image of a current image;
a division module 2 utilized to divide the grey-scale image to obtain a plurality of divided regions;
a first calculating module 3 utilized to respectively calculate JND values corresponding to the divided regions based on an area of each of the divided regions; In the embodiment, said JND (Just noticeable difference) is the smallest noticeable difference, which is a quantity unit for measuring the degree of difference between the two psychological feelings. Since the human eye has different degrees of brightness sensitivity to different images, the JND value can quantitatively measure the impact that the human eye can perceive the image brightness. In a preferred proposal of the embodiment, the JND value is calculated by the following formula:

$$C_{jnd} = \frac{1.97}{S_{jnd}^{0.22} + 0.72};$$

where the $C_{jnd}$ is the JND value, which is indicative of the corresponding contrast difference value of each divided region, and the $S_{jnd}$ is the area of the corresponding divided region.

a second calculating module 4 utilized to calculate a target contrast based on the JND value of each of the divided regions and a background brightness of the current image;
an adjusting module 5 utilized to adjust the contrast of the current image based on the target contrast and a predetermined condition;

In the embodiment, during using the image adjustment device, the acquiring module 1 acquires the grey-scale image; the division module 2 divides the grey-scale image to obtain a plurality of divided regions; the first computing module 3 calculates the JND value of each divided region; the second calculating module 4 calculates the target contrast based on the JND value of each divided region and the background brightness of the current image; the adjusting module 5 adjusts the contrast of the current image based on the calculated target contrast and a predetermined condition. The specific operating principle of the image contrast adjusting device of the embodiment is the same or similar to the relevant description in the image adjustment method of the embodiment in FIG. 1, The details can be referred to the specific description of the embodiments, so no further detail will be provided herein.

Figure 7:
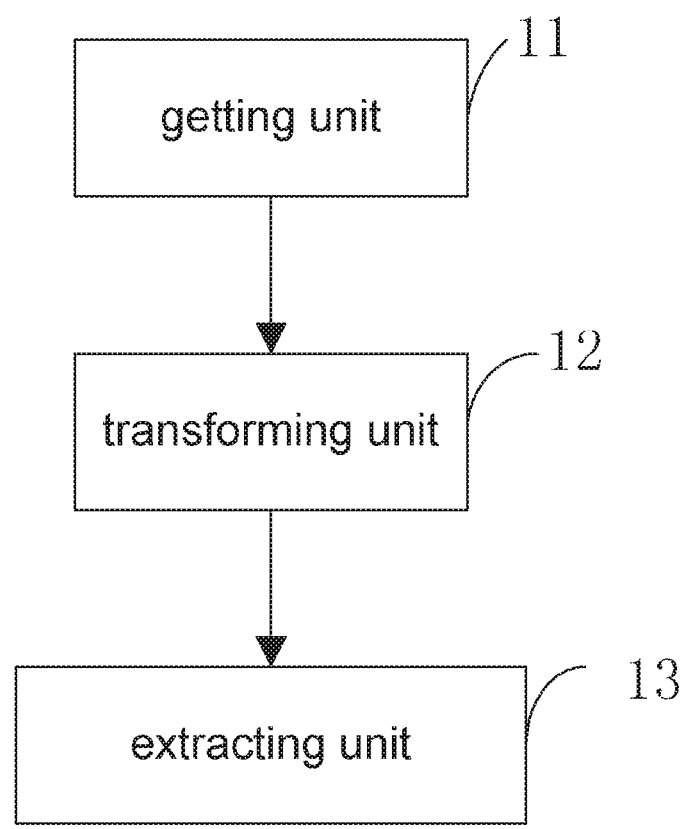
FIG. 7 is a specific block diagram illustrating the acquiring module 1 of the first preferred embodiment.

In a preferred proposal of the present invention, as shown in FIG. 7, which is a specific block diagram illustrating the acquiring module 1 of the first preferred embodiment. The acquiring module 1 specifically includes:
a getting unit 11 utilized to acquire a RGB color image corresponding to the current image;
a transforming unit 12 utilized to transform the RGB color image into a grey-scale image based on a SRGB standard;
an extracting unit 13 utilized to value the brightness of the grey-scale image based on a mode of grey-scale distribution of the grey-scale image to obtain the background brightness of the current image.

In the embodiment, the getting unit 11 acquires the RGB color image of the current image; the transforming unit 12 transforms the RGB color image into the grey-scale image based on the SRGB standard; the extracting unit 13 values the brightness based on a mode of grey-scale distribution of the grey-scale image to obtain the background brightness of the current image.

Figure 8:
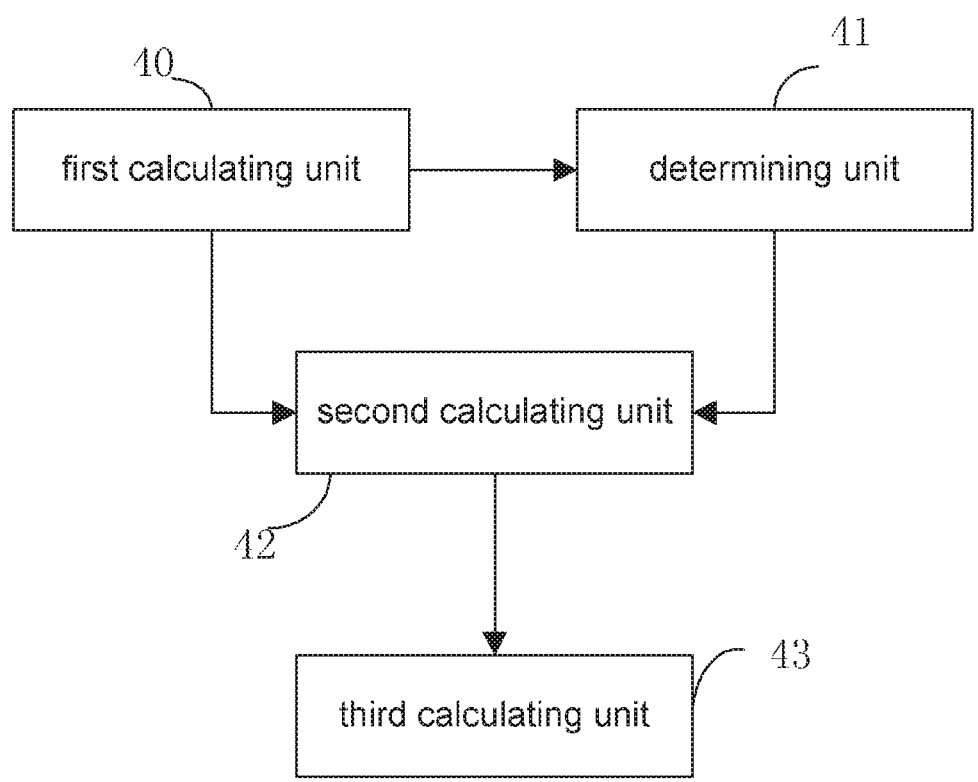
FIG. 8 is a specific block diagram illustrating the second computing module 4 of the first preferred embodiment of the present invention.

In yet another preferred proposal of the present invention, as shown in FIG. 8, which is a specific block diagram illustrating the second computing module 4 of the first preferred embodiment of the image contrast adjusting device of the present invention. The module includes the following units.

A first calculating unit 40 is utilized to calculate the average brightness of each of the divided regions. The average brightness of each divided region needs to be computed first. There are several calculation methods for calculating the average brightness of each of the divided regions. Preferably, the first calculating unit 40 can obtain the average brightness of the divided region by taking an average value of the sum of brightness values of every pixels of one divided region. However, the average brightness also can be calculated by using other ways. This is not restricted herein.

A determining unit 41 is utilized to respectively determine whether the average brightness of each of the divided regions is larger than the background brightness of the current image, to obtain a determined result. In the embodiment, the determining unit 40 determines the average brightness of each divided region with the background brightness of the current image. When the average brightness is larger than the background brightness, the determination is a first determined result. When the average brightness is less than the background brightness, the determination is a second determined result.

A second calculating unit 40 is utilized to calculate the regional contrast quantized value of the divided regions corresponding to the determined result based on the average brightness of each of the divided regions, the JND value, and the background brightness of the current image. Specifically, the contrast quantized values are calculated by different methods according to the different determined results. That is, the regional contrast quantized values of the corresponding divided regions of the first determined result and the corresponding divided region of the second determined result are calculated by using different paths.

A third calculating unit 43 is utilized to calculate the target contrast according to the contrast quantized value. In the embodiment, the target contrast is the sum of the calculated contrast quantized values.

The specific operating principle of the image adjusting device of the embodiment is the same to the specific operating principle of the corresponding embodiment in FIG. 3, so no further detail will be provided herein.

Figure 9:
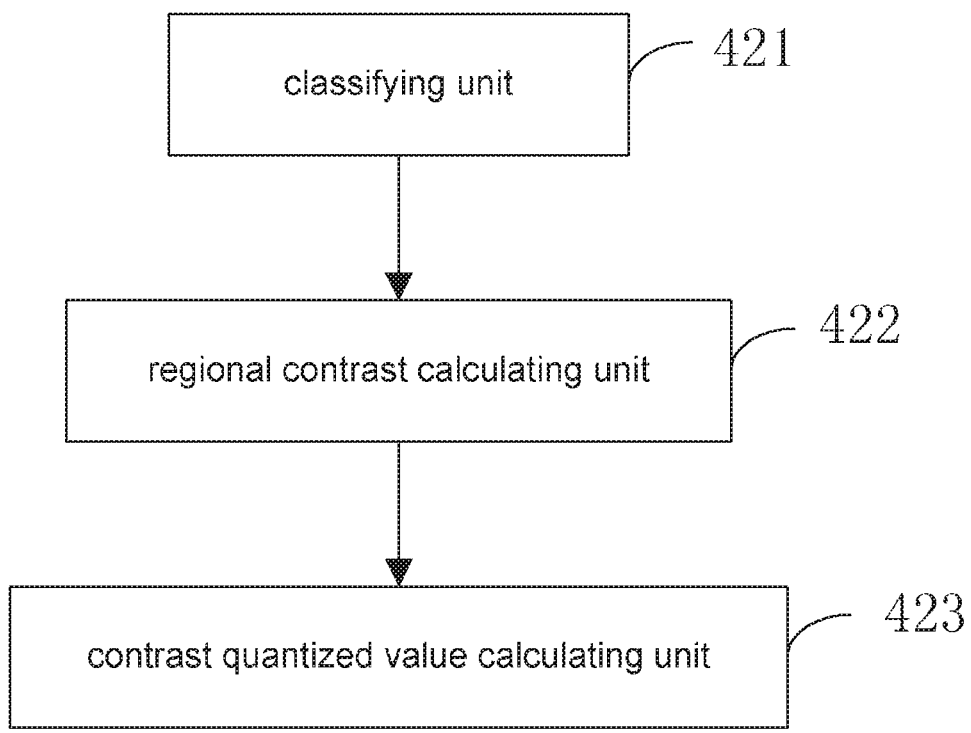
FIG. 9 is a specific block diagram illustrating the second calculating unit 42 of the corresponding embodiment in FIG. 8.

In a preferred proposal of the present invention, as shown in FIG. 9, which is a specific block diagram illustrating the second calculating unit 42 of the corresponding embodiment in FIG. 8. The second calculating unit 42 specifically comprises the following units.

A classifying unit 421 is utilized to classify each of the divided regions based on the determined result. The classifying unit 421 herein is specifically utilized to classify the divided regions into a first class of the divided regions and a second class of the divided regions based on the determined result. Furthermore, Herein the divided regions corresponding to the first determined result are classified into the first class, and the divided regions corresponding to the second determined result are classified into the second class. In the embodiment, taking the background brightness as a boundary, the divided regions are divided into two categories, and the contrast values of the corresponding areas are respectively calculated, thereby more effectively adjusting the contrast of the image.

A regional contrast calculating unit 422 is utilized to calculate the regional contrast of each class of the divided regions based on the classified result, the average brightness of each class of divided regions, and the background brightness of the current image.

In the embodiment, specifically, the regional contrast of each divided region in the first class of the divided regions can be obtained by utilizing a first formula; the regional contrast of each divided region in the second class of the divided regions can be obtained by utilizing a second formula. The first formula is: $C_H = I_{ave}/I_{bg}$; the second formula is: $C_L = I_{bg}/I_{ave}$, wherein the $C_H$ is the regional contrast of the divided region in the first class of the divided regions, and the $C_L$ is the regional contrast of the divided region in the second class of the divided regions, the $I_{ave}$ is the value of the average brightness of the divided region, the $I_{bg}$ is the background brightness of the current image.

A contrast quantized value calculating unit 423 is utilized to calculate the contrast quantized value of each of the divided regions based on the regional contrast of each of the divided regions and the corresponding JND value. In the embodiment, the contrast quantized value may be calculated by the following formula. As to the first class of the divided regions, the contrast quantized value of each divided region in the first class of the divided regions is calculated by utilizing the formula $C_{H\text{-}jnd} = C_H/C_{jnd}$; as to the second class of the divided regions, the contrast quantized value of each divided region in the second class of the divided regions is calculated by utilizing the formula $C_{L\text{-}jnd} = C_L/C_{jnd}$.

The specific operating principle of the embodiment is the same to the specific operating principle of the corresponding embodiment in FIG. 4, so no further detail will be provided herein.

Figure 10:
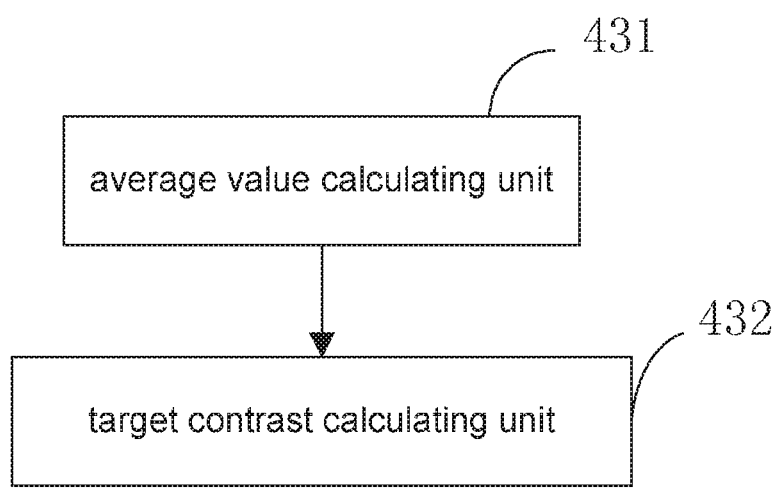
FIG. 10 is a specific block diagram illustrating the third calculating unit 43 of the corresponding embodiment in FIG. 8.

Furthermore, as shown in FIG. 10, which is a specific block diagram illustrating the third calculating unit 43 of the corresponding embodiment in FIG. 8. The third calculating unit 43 specifically comprises the following units.

An average value calculating unit 431 is utilized to calculate the contrast average value of each class of the divided regions based on the contrast quantized value of each of the divided regions. Specifically, the contrast average value of the class of the divided regions is obtained respectively for each class of the divided regions. The corresponding contrast average value can be the average value of the sum of the contrast quantized values of the class of the divided regions. In the embodiment, the contrast average values of the first class and the second class of the divided regions are respectively obtained.

A target contrast calculating unit 432 is utilized to calculate the target contrast based on the contrast average value of each class of the divided regions. The target contrast is just the sum of the contrast average values of the first class and the second class of the divided regions.

The specific operating principle of the embodiment is the same to the specific operating principle of the corresponding embodiment in FIG. 5, so no further detail will be provided herein.

To facilitate understanding the technical solution, the technical solution of the present invention will be described in a simple image processing as follows.

Figure 11:
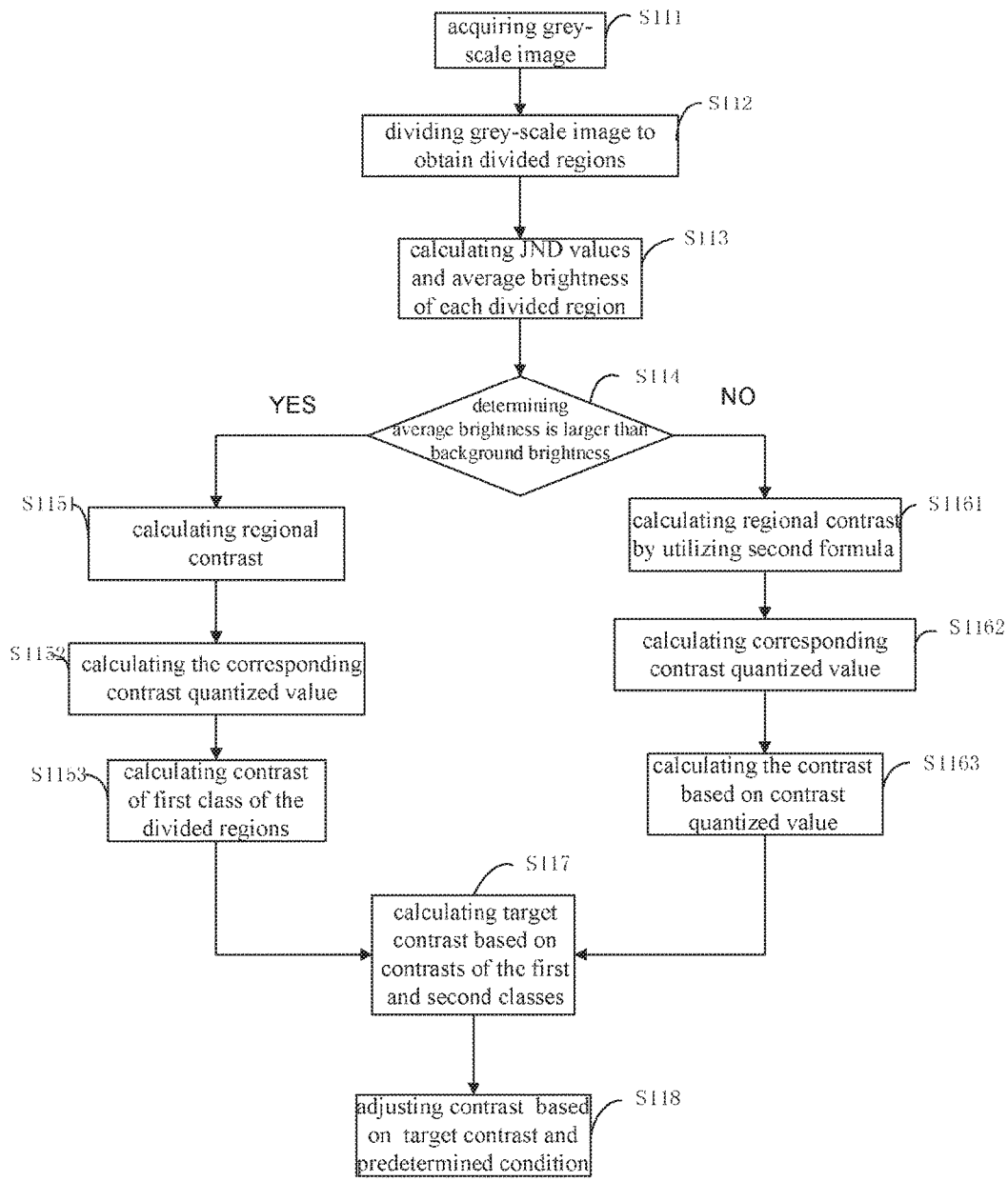
FIG. 11 is a flow chart illustrating a method for adjusting contrast according to a specific embodiment of the present invention.
Figure 12:
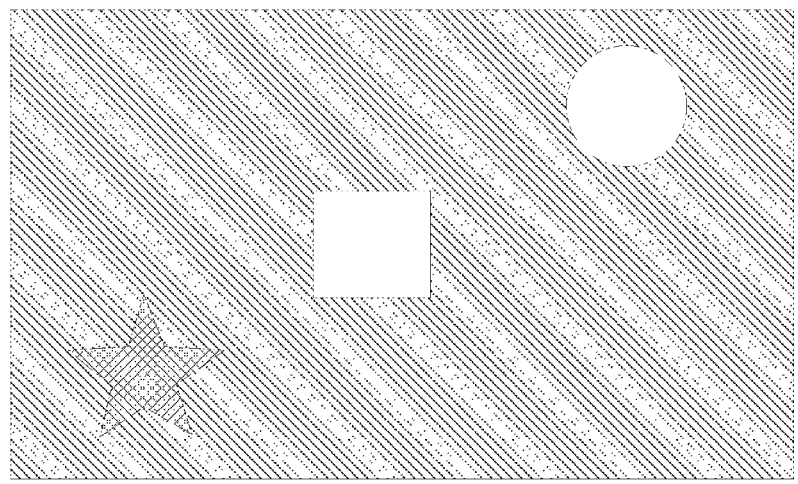
FIG. 12 is a feature divided image of the present invention.

As shown in FIG. 11, which is a flow chart illustrating a method for adjusting contrast according to a specific embodiment of the present invention. FIG. 12 is a corresponding divided image.

Step S111, acquiring a corresponding grey-scale image of a current image;

Step S112, dividing the grey-scale image to obtain a plurality of divided regions; As shown in FIG. 6, shapes of the different divided regions are not the same. They includes star, square and circle (see FIG. 12), in the process, the background color is detected to obtain the background brightness $I_{bg}$.

Step S113, calculating the JND values and the average brightness of each of the divided regions; that is, respectively calculating the JND values of the star, square and circular divided regions; and respectively calculating the average brightnesses of the star, square and circular divided regions. It should be noted that the calculation of the average brightness can be performed before or after calculating the JND values, or simultaneously with calculating the JND values. This is not restricted herein.

S114, determining whether the average brightness of each of the divided regions is larger than the background brightness to obtain a first and second determined result; The first determined result is got when the determination is yes; the second determined result is got when the determination is no. The divided regions corresponding to the first determined result are classified into the first class of the divided regions (turning to step S1151), and the divided regions corresponding to the second determined result are classified into the second class of the divided regions (turning to step S1161). In the embodiment, since the average brightness of the star divided region is less than the background brightness, it is classified into the second class of the divided regions. The average brightnesses of both the square and circular divided regions are larger than the background brightness; they are classified into the first class of the divided regions.

Step S1151, calculating the regional contrast of the corresponding divided region by utilizing the first formula; specifically, as to the first class of the divided regions, the regional contrast of the corresponding divided region is calculated by using the first formula. In the embodiment, the regional contrasts of the square and circular divided regions are respectively calculated based on the first formula $C_H = I_{ave}/I_{bg}$.

Step S1152, calculating the corresponding contrast quantized value based on the calculated regional contrast and the JND value; Based on the JND value and regional contrast of the square divided region, the formula of $C_{H\text{-}jnd} = C_H/C_{jnd}$ is employed to calculate the contrast quantized value, similarly, to calculate the contrast quantized value of the circular divided region.

Step S1153, calculating the contrast of the first class of the divided regions based on the contrast quantized value; summing the contrast average value of the square divided regions and the contrast quantized value of the circular divided region and taking an average value thereof to obtain the contrast average value of the first class of the divided regions, and then turning to step S117.

Step S1161, calculating the regional contrast of the corresponding divided region by utilizing the second formula;
In the embodiment, as to the second class of the divided regions, the regional contrast of the corresponding divided region is calculated by using the second formula $C_L = I_{bg}/I_{ave}$. Since the second class of the divided regions only has the star divided region, only the regional contrast of the star divided region needs to be calculated. In other embodiments of the present invention, when the second class of the divided regions includes more than two divided regions, the regional contrasts of the divided regions are calculated respectively;

Step S1162, calculating the corresponding contrast quantized value based on the calculated regional contrast and the JND value; Based on the JND value and regional contrast of the star divided region, the formula of $C_{L\text{-}jnd} = C_L/C_{jnd}$ is employed to calculate the contrast quantized value.

Step S1163, calculating the contrast of the second class of the divided regions based on the contrast quantized value; since there is only one star divided region, the contrast value of the second class of the divided regions is the contrast quantized value of the star divided region. In other embodiments of the present invention, when the second class of the divided regions includes more than two divided region, the corresponding contrast needs to be obtained by taking the average value of the sum of the contrast quantized values of the two divided regions, and then execution turns to step S117.

Step S117, calculating the target contrast based on the contrasts of the first class of the divided regions and the second class of the divided regions;
In the embodiment, the target contrast is the sum of the contrasts of the first class of the divided regions and the contrasts of the second class of the divided regions obtained from the step S1153 and step S1163.

Step S118, adjusting the contrast of the current image based on the target contrast and a predetermined condition. The predetermined condition may include a resolution requirement of the display screen, the contrast of the current image, and other display parameters. This is not restricted herein.

In the present invention, the contrast of the entire image is eventually obtained by first dividing the grey-scale image to obtain the plurality of divided regions, determining the average brightness of each divided region with the background brightness, classifying the plurality of divided regions according to the determined result, respectively calculating the contrast quantized values for the corresponding divided regions based on the JND value of each divided region, and obtaining the contrast average value of each class of the divided regions. In the present invention, since the contrast of the image is adjusted according to the regions by using the JND values, the area of each divided region can be adjusted correspondingly. In the processes of the contrast adjustment, the impact that the human eye can perceive the image brightness is considered, so that the image contrast is closer to the needs of the human eye, and the contrast adjustment is more scientific.

The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for adjusting contrast performed by a display device comprising a processor and a memory comprising a plurality of program instructions executable by the processor, the method comprising:
   S1, acquiring a corresponding grey-scale image of a current image;
   S2, dividing the grey-scale image to obtain a plurality of divided regions;
   S3, calculating just-noticeable difference (JND) values corresponding to the divided regions based on an area of each of the divided regions;
   S4, calculating a target contrast based on the JND value of each of the divided regions and a background brightness of the current image; and
   S5, adjusting the contrast of the current image based on the target contrast and a predetermined condition;
   wherein the step S2 specifically is: dividing the grey-scale image by utilizing a watershed algorithm to obtain the plurality of divided regions;
   the step S4 specifically comprises:
   S40, calculating an average brightness of each of the divided regions;
   S41, determining whether a value of the average brightness of each of the divided regions is larger than the background brightness to obtain a determined result;
   S42, calculating a contrast quantized value of the corresponding divided region based on the average brightness of each of the divided regions, the JND value of each of the divided regions, the background brightness of the current image, and the determined result;
   S43, calculating the target contrast according to the contrast quantized value.

2. The method for adjusting contrast according to claim 1, wherein the step S42 specifically comprises:
   S421, classifying the divided regions based on the determined result;
   S422, calculating a regional contrast of each class of the divided regions based on the classified result, the average brightness of each class of the divided regions, and the background brightness of the current image;
   S423, calculating the contrast quantized value of each of the divided regions based on the regional contrast of each of the divided regions and the corresponding JND value.

3. The method for adjusting contrast according to claim 2, wherein the step S43 specifically comprises:
   S431, calculating a contrast average value of each class of all the divided regions based on the contrast quantized value of each of the divided regions;
   S432, calculating the target contrast based on the contrast average value of each class of the divided regions.

4. The method for adjusting contrast according to claim 2, wherein the step S421 specifically is:
   classifying the divided regions into a first class of the divided regions and a second class of the divided regions based on the determined result;
   the step S422 specifically is:
   calculating the regional contrast of each divided region in the first class of the divided regions by utilizing a first formula; and
   calculating the regional contrast of each divided region in the second class of the divided regions by utilizing a second formula;
   wherein the first formula is: $C_H = I_{ave}/I_{bg}$;
   the second formula is: $C_L = I_{bg}/I_{ave}$;

wherein the $C_H$ is the regional contrast of the divided region in the first class of the divided regions, and the $C_L$ is the regional contrast of the divided region in the second class of the divided regions, the $I_{ave}$ is the value of the average brightness of the divided region, the $I_{bg}$ is the background brightness of the current image.

5. The method for adjusting contrast according to claim 4, wherein the step S423 specifically is:
calculating the contrast quantized value of the divided region in the first class of the divided regions by utilizing a formula $C_{H\text{-}jnd}=C_H/C_{jnd}$; and
calculating the contrast quantized value in the second class of the divided regions by utilizing a formula $C_{L\text{-}jnd}=C_L/C_{jnd}$;
wherein the $C_{H\text{-}jnd}$ is the contrast quantized value of the divided region in the first class of the divided regions, the $C_{jnd}$ is the JND value, which is indicative of the contrast difference value of each divided region.

6. The method for adjusting contrast according to claim 1, wherein the JND value is computed by utilizing a following formula in the step S3, the following is:

$$C_{jnd} = \frac{1.97}{S_{jnd}^{0.22} + 0.72}$$

wherein the $S_{jnd}$ is the area of the corresponding divided region.

7. The method for adjusting contrast according to claim 1, wherein the step S1 comprises:
S11, acquiring a RGB color image of the current image;
S12, transforming the RGB color image into a grey-scale image based on a SRGB standard; and
S13, valuing the grey-scale image based on a mode of grey-scale distribution of the grey-scale image to obtain the background brightness of the current image.

8. A method for adjusting contrast, performed by a display device comprising a processor and a memory comprising a plurality of program instructions executable by the processor, the method comprising:
S1, acquiring a corresponding grey-scale image of a current image;
S2, dividing the grey-scale image to obtain a plurality of divided regions;
S3, calculating just-noticeable difference (JND) values corresponding to the divided regions based on an area of each of the divided regions;
S4, calculating a target contrast based on the JND value of each of the divided regions and a background brightness of the current image; and
S5, adjusting the contrast of the current image based on the target contrast and a predetermined condition.

9. The method for adjusting contrast according to claim 8, wherein the step S4 specifically comprises:
S40, calculating an average brightness of each of the divided regions;
S41, determining whether a value of the average brightness of each of the divided regions is larger than the background brightness to obtain a determined result;
S42, calculating a contrast quantized value of the corresponding divided region based on the average brightness of each of the divided regions, the JND value of each of the divided regions, the background brightness of the current image, and the determined result;
S43, calculating the target contrast according to the contrast quantized value.

10. The method for adjusting contrast according to claim 9, wherein the step S42 specifically comprises:
S421, classifying the divided regions based on the determined result;
S422, calculating a regional contrast of each class of the divided regions based on the classified result, the average brightness of each class of the divided regions, and the background brightness of the current image;
S423, calculating the contrast quantized value of each of the divided regions based on the regional contrast of each of the divided regions and the corresponding JND value.

11. The method for adjusting contrast according to claim 10, wherein the step S43 specifically comprises:
S431, calculating a contrast average value of each class of all the divided regions based on the contrast quantized value of each of the divided regions;
S432, calculating the target contrast based on the contrast average value of each class of the divided regions.

12. The method for adjusting contrast according to claim 10, wherein the step S421 specifically is:
classifying the divided regions into a first class of the divided regions and a second class of the divided regions based on the determined result;
the step S422 specifically is:
calculating the regional contrast of each divided region in the first class of the divided regions by utilizing a first formula; and
calculating the regional contrast of each divided region in the second class of the divided regions by utilizing a second formula;
wherein the first formula is: $C_H=I_{ave}/I_{bg}$;
the second formula is: $C_L=I_{bg}/I_{ave}$;
wherein the $C_H$ is the regional contrast of the divided region in the first class of the divided regions, and the $C_L$ is the regional contrast of the divided region in the second class of the divided regions, the $I_{ave}$ is the value of the average brightness of the divided region, the Ibg is the background brightness of the current image.

13. The method for adjusting contrast according to claim 12, wherein the step S423 specifically is:
calculating the contrast quantized value of the divided region in the first class of the divided regions by utilizing a formula $C_{H\text{-}jnd}=C_H/C_{jnd}$; and
calculating the contrast quantized value in the second class of the divided regions by utilizing a formula $C_{L\text{-}jnd}=C_L/C_{jnd}$;
wherein the $C_{H\text{-}jnd}$ is the contrast quantized value of the divided region in the first class of the divided regions, the $C_{jnd}$ is the JND value, which is indicative of the contrast difference value of each divided region.

14. The method for adjusting contrast according to claim 8, wherein the step S2 specifically is: dividing the grey-scale image by utilizing a watershed algorithm to obtain the plurality of divided regions.

15. The method for adjusting contrast according to claim 14, wherein the JND value is computed by utilizing a following formula in the step S3, the following is:

$$C_{jnd} = \frac{1.97}{S_{jnd}^{0.22} + 0.72}$$

wherein the $S_{jnd}$ is the area of the corresponding divided region.

16. The method for adjusting contrast according to claim 8, wherein the step S1 comprises:
- S11, acquiring a RGB color image of the current image;
- S12, transforming the RGB color image into a grey-scale image based on a SRGB standard; and
- S13, valuing the grey-scale image based on a mode of grey-scale distribution of the grey-scale image to obtain the background brightness of the current image.

* * * * *